UNITED STATES PATENT OFFICE.

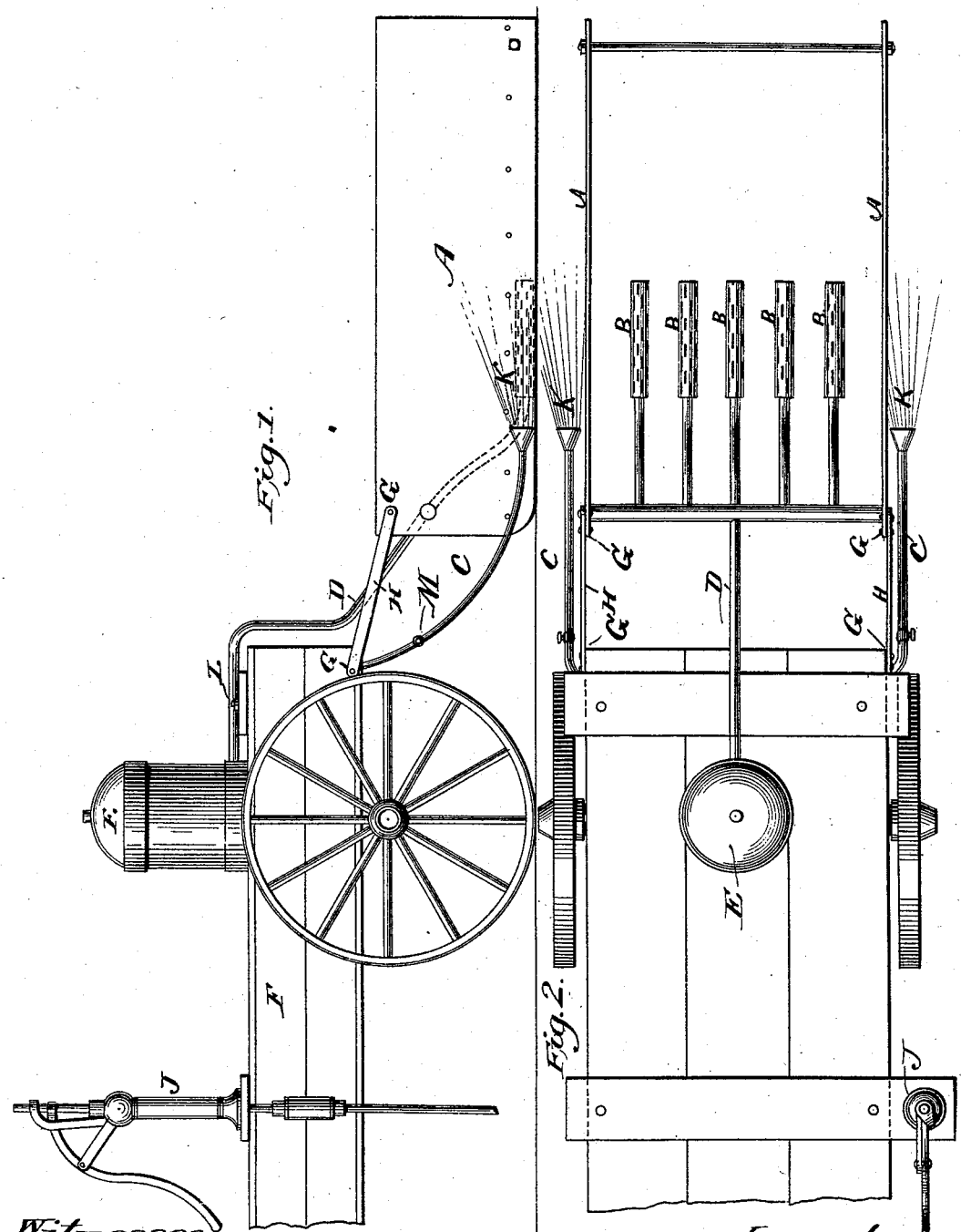

CHARLES RISDON AND JAMES C. TOLIVER, OF AINSWORTH, NEBRASKA.

FIRE-GUARD AND BACK-FIRING MACHINE.

SPECIFICATION forming part of Letters Patent No. 531,648, dated January 1, 1895.

Application filed February 2, 1894. Serial No. 498,885. (No model.)

*To all whom it may concern:*

Be it known that we, CHARLES RISDON and JAMES C. TOLIVER, citizens of the United States, residing at Ainsworth, in the county of Brown and State of Nebraska, have invented certain new and useful Improvements in Fire-Guards and Back-Firing Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

A movable machine for burning prairie grass within a specified space, consisting of a series of jet burners inclosed at the front and sides by upright metal shields with water sprays running on the outside of the side shields to prevent the spread of the fire; the side shields being placed about four feet apart and dragged parallel with each other over the prairie, the front shield being long enough to fill the space between the side shields in front, the jet burners being placed between them in the front in such a manner as to ignite all the grass and weeds between the two shields, and a spray of water being conducted by means of pipes connected with a water tank and thrown over the grass and weeds on the outside of the shield wetting it in such a manner as to prevent the fire from spreading, thus enabling the burning of fireguards with perfect safety; the front shield being hung on hinges so as to drag immediately in front of the firing apparatus. We attain these objects by the mechanism illustrated in the accompanying drawings, in which—

Figure 1 represents a side view of the machine, attached to a vehicle by means of movable bar H. at G. G. A. represents the upright metal side shield, sharp and cutting at lower edge. B. represents the fire jets supplied with mineral oil from the tank E. by means of the pipe D. K. is a spray of water supplied from tank F. through pipes C. and is thrown over the grass on the outside of shield A. as the machine moves over the surface of the ground. I. is a pump for the purpose of filling tank F. with water. L. is a stop cock in pipe D. to prevent the flow of fuel when necessary. M. is a stop cock in the pipe C. to prevent the flow of water when not needed.

Fig. 2 represents a top view of the machine in which K. K. shows the water spraying over the grass on the outside of shields A. A. Either of the shields A. A. can be lifted and either of the water sprays K. K. can be shut off so as to allow the fire to escape and spread to that side if desirable to meet other fires.

What we claim as our invention, and desire to secure by Letters Patent, is—

The combination with fire jets, metal shields to inclose the same, water sprays exterior to the shields, and connections therefrom to the water tank, substantially as described.

In testimony whereof we affix our signatures in presence of two witnesses.

CHARLES RISDON.
JAMES C. TOLIVER.

Witnesses:
J. A. NAY,
B. B. MASTICK.